US00RE45568E

(19) United States
(12) Reissued Patent
Chavakula

(10) Patent Number: US RE45,568 E
(45) Date of Reissued Patent: Jun. 16, 2015

(54) MULTI-POWER CHARGER AND BATTERY BACKUP SYSTEM

(71) Applicant: Anand Kumar Chavakula, Hyattsville, MD (US)

(72) Inventor: Anand Kumar Chavakula, Hyattsville, MD (US)

(21) Appl. No.: 13/774,606

(22) Filed: Feb. 22, 2013

Related U.S. Patent Documents

Reissue of:
(64) Patent No.: 7,893,657
Issued: Feb. 22, 2011
Appl. No.: 11/957,086
Filed: Dec. 14, 2007

U.S. Applications:
(60) Provisional application No. 60/875,552, filed on Dec. 19, 2006.

(51) Int. Cl.
*H01M 10/46* (2006.01)
*H02J 7/00* (2006.01)

(52) U.S. Cl.
CPC ..... *H02J 7/0055* (2013.01)

(58) Field of Classification Search
CPC ..... H02J 7/0055; H02J 7/0013; H02J 7/0016
USPC ..... 320/112, 114, 115, 116, 138; 307/11, 307/21, 23, 28, 29, 46, 66
See application file for complete search history.

(56) References Cited

U.S. PATENT DOCUMENTS

| | | | | |
|---|---|---|---|---|
| 2,237,963 | A | | 4/1941 | Hawks |
| 2,810,821 | A | | 10/1957 | Cohn |
| 3,085,150 | A | | 4/1963 | Bautsch |
| 3,105,183 | A | | 9/1963 | Hysler et al. |
| 4,160,941 | A | | 7/1979 | Bennett |
| 4,161,682 | A | | 7/1979 | Corvette |
| 4,227,092 | A | | 10/1980 | Campagnuolo et al. |
| 4,232,260 | A | | 11/1980 | Lambkin |
| 4,725,740 | A | | 2/1988 | Nakata |
| 5,103,157 | A | * | 4/1992 | Wright ..... 323/275 |
| 5,220,269 | A | | 6/1993 | Chen et al. |
| 5,420,494 | A | | 5/1995 | Lu |
| 5,489,002 | A | | 2/1996 | Streiff |
| 5,686,809 | A | | 11/1997 | Kimura et al. |
| 5,694,019 | A | | 12/1997 | Uchida et al. |

(Continued)

FOREIGN PATENT DOCUMENTS

| | | | |
|---|---|---|---|
| EP | 0887659 | A2 | 12/1998 |
| GB | 2299457 | A | 10/1996 |
| JP | 408007602 | A | 1/1996 |

OTHER PUBLICATIONS

Eton Corporation. Eton FR-300 Operation Manual. Jan. 15, 2005.

(Continued)

*Primary Examiner* — Edward Tso
(74) *Attorney, Agent, or Firm* — Whiteford, Taylor & Preston, LLP; Peter J. Davis

(57) ABSTRACT

A multi-power charger comprises an internal battery, receptacles for connecting one or more external power sources, and output receptacles for connecting to an electronic device. A voltage selection circuit determines an operating voltage of the first device and selects a power supply source to supply the operating voltage the device. The power supply source may be the internal battery, the external power source, or both. The operating voltage is delivered to the device via the output receptacle.

20 Claims, 12 Drawing Sheets

(56) References Cited

U.S. PATENT DOCUMENTS

| | | | | |
|---|---|---|---|---|
| 5,701,067 | A | 12/1997 | Kaji et al. | |
| 5,929,597 | A | 7/1999 | Pfeifer et al. | |
| 6,137,280 | A | 10/2000 | Ackermann | |
| 6,160,389 | A | 12/2000 | Watts | |
| 6,252,706 | B1 | 6/2001 | Kaladgew | |
| 6,327,484 | B1 | 12/2001 | Mathew | |
| 6,472,846 | B1 | 10/2002 | Hutchinson et al. | |
| 6,566,766 | B2 * | 5/2003 | Matsuda et al. | 307/82 |
| 6,583,601 | B2 | 6/2003 | Simoes et al. | |
| 6,605,926 | B2 | 8/2003 | Crisp et al. | |
| 6,690,141 | B1 | 2/2004 | Yu | |
| 6,759,833 | B1 | 7/2004 | Chen | |
| 6,818,035 | B2 | 11/2004 | McGahey, Jr. | |
| 6,849,960 | B2 | 2/2005 | Hartman et al. | |
| 6,914,340 | B2 | 7/2005 | Becker et al. | |
| 6,930,403 | B2 | 8/2005 | Hartman et al. | |
| 6,943,459 | B2 | 9/2005 | Hartman et al. | |
| 6,946,817 | B2 | 9/2005 | Fischer et al. | |
| 6,995,542 | B2 | 2/2006 | Yu et al. | |
| 7,019,492 | B1 | 3/2006 | Baker et al. | |
| 7,030,592 | B2 | 4/2006 | Yu | |
| 7,049,708 | B2 | 5/2006 | Hartman et al. | |
| 7,259,541 | B2 | 8/2007 | Yu et al. | |
| 8,063,610 | B2 * | 11/2011 | Chavakula | 320/138 |
| 2004/0051501 | A1 | 3/2004 | Yu et al. | |
| 2004/0090210 | A1 | 5/2004 | Becker et al. | |
| 2004/0130156 | A1 | 7/2004 | Hartman et al. | |
| 2004/0164704 | A1 | 8/2004 | Yang | |
| 2005/0253560 | A1 | 11/2005 | Popescu-Stanesti | |
| 2006/0154690 | A1 | 7/2006 | Hess | |
| 2007/0072474 | A1 | 3/2007 | Beasley | |
| 2007/0096692 | A1 | 5/2007 | Chuang et al. | |

OTHER PUBLICATIONS

Reitz, Ken. "MT Review: Eton FR-300: It's Not Just for Emergencies!" Monitoring Times. Oct. 2005. p. 68.

Mossberg, Walt and Katherine Boehret. "This Is a Test of Emergency Power Systems." The Digital Solution Category of the Wall Street Journal. Sep. 21, 2005. http://allthingsd.com/20050921/emergency-power-test/.

Krakow, Gary. "Gadgets to help you through a hurricane." NBC News. Oct. 19, 2005. http:www.nbcnews.com/id/9437489/ns/technology_and_science-tech_and_gadgets/t/gadgets-help-you-through-hurricane/#.U4aAICjLJts.

Eton Corporation. FR300 Multi-Purpose Radio Specifications. 2005.

Initial Disclosure of Invalidity Contentions in Defense of Infringement dated May 29, 2014.

WIPO, International Search Report, PCT/US2008/086422; dated Jul. 20, 2009; 11pgs.

International Preliminary Report on Patentability, Intl. Application PCT/US2008/086422. International Bureau of WIPO, Jun. 24, 2010 (6 pages).

* cited by examiner

MULTI-POWER CHARGER AND BATTERY BACKUP SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims priority from Provisional Patent Application No. 60/875,552, filed Dec. 19, 2006 whose contents are incorporated herein in its entirety for all purposes.

BACKGROUND AND SUMMARY

Since the advent of mobile and portable electronic devices for various applications, many types of charging systems have been designed or developed to supplement power to mobile electronic devices and/or to recharge the batteries of those systems. Those power sources include crank type/dynamo chargers, solar chargers, battery packs, AC/DC chargers, and any combination of these various features. While they have been useful to some degree, many of these so called universal multi-function chargers are not both practical and portable. That is, the devices as implemented are either functionally useful but not truly portable or portable but not fully or optimally functional in their various design embodiments internally and or externally.

What would be truly useful would be a multi-power battery charger and battery backup system that enables universal connectivity and portability without sacrificing one for the other. Such a system would permit manual or automatic specification of charging characteristics and be able to accept single, multiple and simultaneous power inputs for charging purposes and do so automatically without user intervention or be selectable as desired by a user. It would be additionally useful for the multi-power charger to enable the transfer of data between various devices.

DETAILED DESCRIPTION

Figure 1:
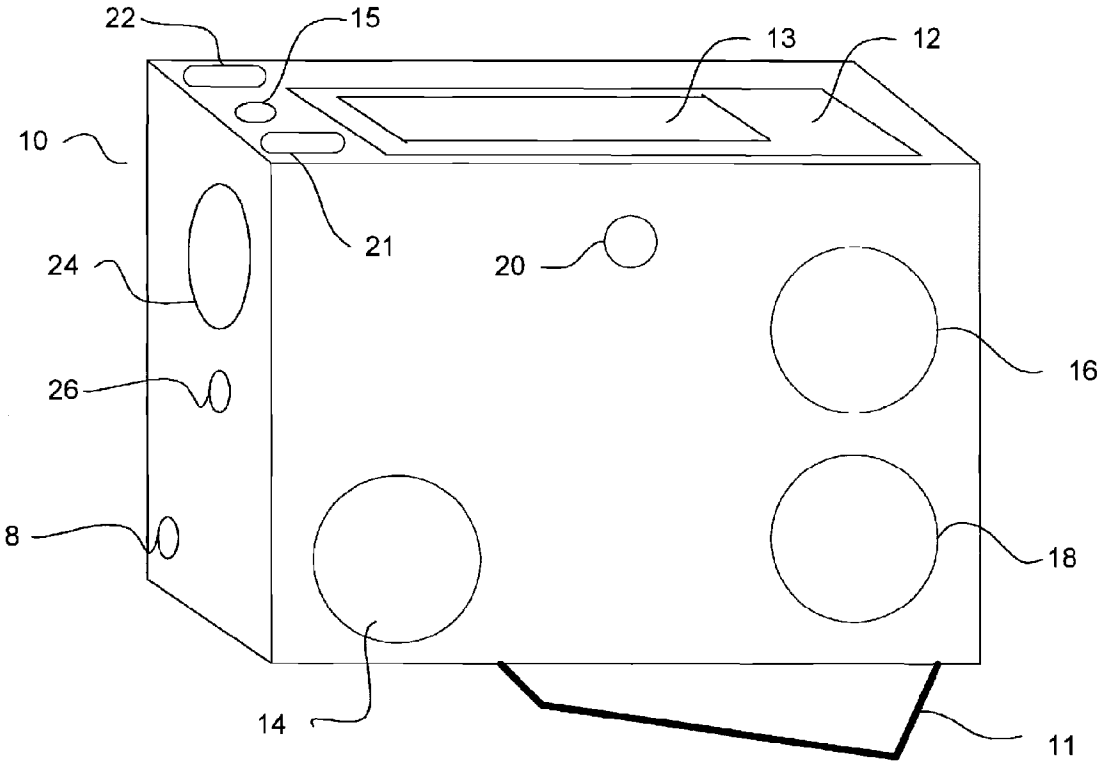
FIG. 1 illustrates a block diagram of a Multi-power Charger/backup system (MPC) according to an embodiment.

FIG. 1 illustrates a block diagram of a multi-power charger/backup system (MPC) according to an embodiment. The MPC 10 comprises a compartmented case comprising a control panel 12 whereby the functionality of the MPC 10 is controlled. The control panel 12 has an integral LCD display 13 which displays the various functions and capabilities of the MPC 10. The MPC's internal CPU is designed to handle charging from a wide variety of voltages ranging from about 1.9 volts to 24 volts or more as desired with the appropriate watts and amperage that is suitable to various portable devices that use such power requirements by user selection. The MPC 10 further comprises retractable power output cables contained in a generally wheel-like structure 16, 18 for providing or transmitting power to portable devices. The wheel-like structures 16, 18 are removable to facilitate replacement of cables that have failed or use cables that are configured to implement the data transfer and data exchange features described below. Additionally, the MPC 10 further comprises a retractable input cable contained in a wheel-like structure 14 for receiving input power from electrical sources to provide battery charging for an internal battery (see FIG. 3, [28] *32*). The wheel-like structure 14 is removable to facilitate replacement of a cable that has failed or use a cable that is configured to implement the data transfer and data exchange features described below. The top portion of the MPC further comprises an actuation button 22 to actuate an internal flashlight 24 and an actuation button 21 for actuating an internal laser pointer 26. The MPC also has an attachment point 20 to which a belt clip can be inserted (not shown), so that the MPC 10 can be carried wherever the user desires. A receptacle 8 is provided for connection of an external recharging device that provides the appropriate voltage and current for recharging the battery (see FIG. 3, [28] *32*).

In an embodiment, a compass 15 is provided. This placement is highly useful as the user can easily see the compass in the MPC if that MPC is being worn on the belt, for example.

As a further methodology to charge the internal battery of the MPC 10, a dynamo internal to the MPC (not shown) is provided. The dynamo is turned by hand crank 11, which is actuated by a squeezing motion by the user. This hand crank handle is in the shape of a scissor-like form to enable one-handed crank motion as opposed to a two-handed type crank motion i.e., one hand to hold a crank unit and the other hand to rotate a handle clock-wise to actuate crank based dynamo charging. The design of the MPC's crank handle enables a user to hold the MPC by the thumb of one hand and crank with the other fingers of the same hand. This design also better enables the crank action to fit the position of a user when seated. In other words, the up and down motion is located to one end of the handle only and the other end fitted with a pivot connected to the charger frame.

Figure 2:
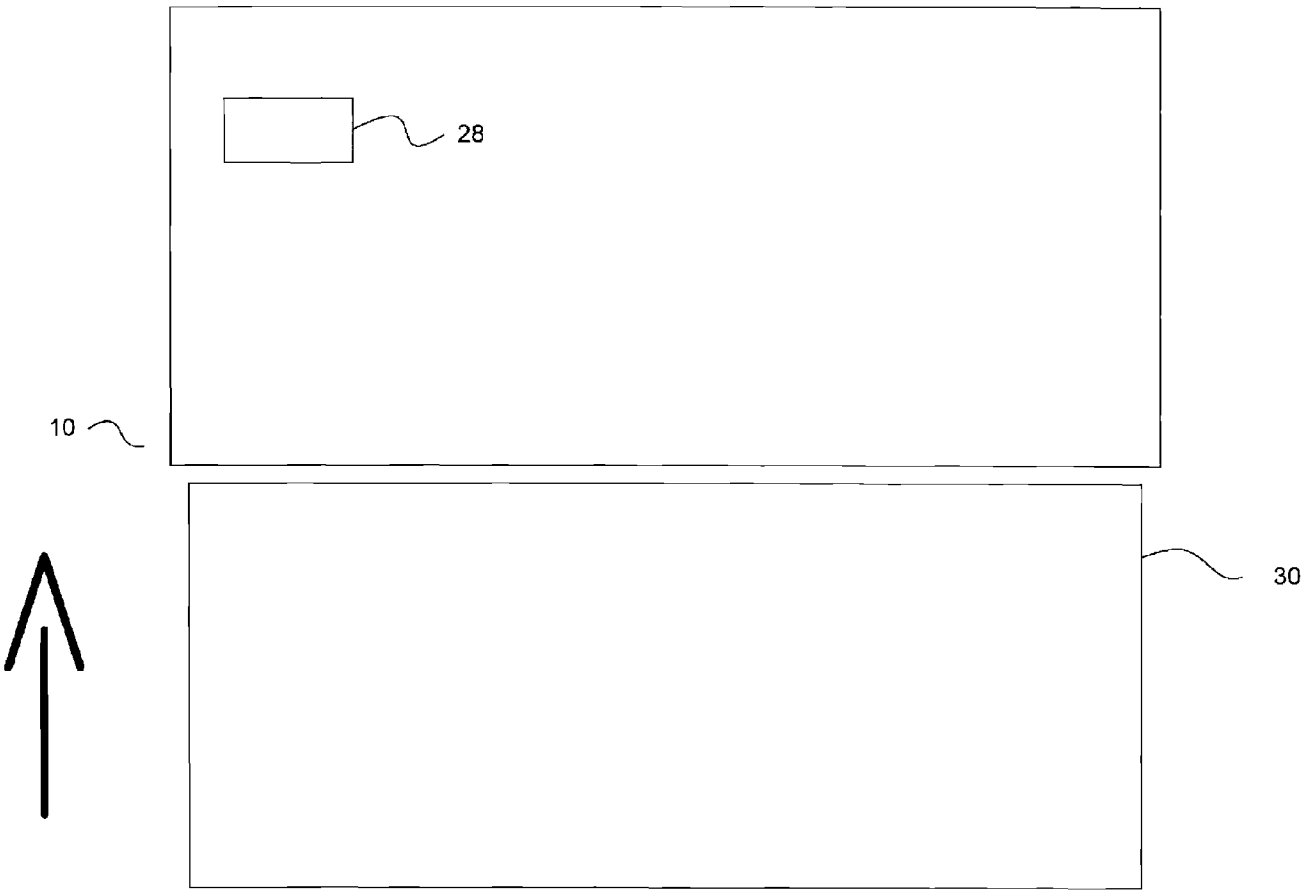
FIG. 2 illustrates additional elements of the Multi-power Charger (MPC) according to an embodiment.

FIG. 2 illustrates additional elements of the MPC according to an embodiment. The MPC 10 further comprises a removable external face 30 which can be, in various embodiments, a solar cell which provides a charge to the internal battery or other removable power chargeable services or attachable/insertable devices that can be inserted in the same slot as the solar panel as described below. The MPC 10 comprises a slot having electrical contacts 28, which contacts allow for connectivity to internal circuits of the MPC 10 as further described below.

Figure 3:
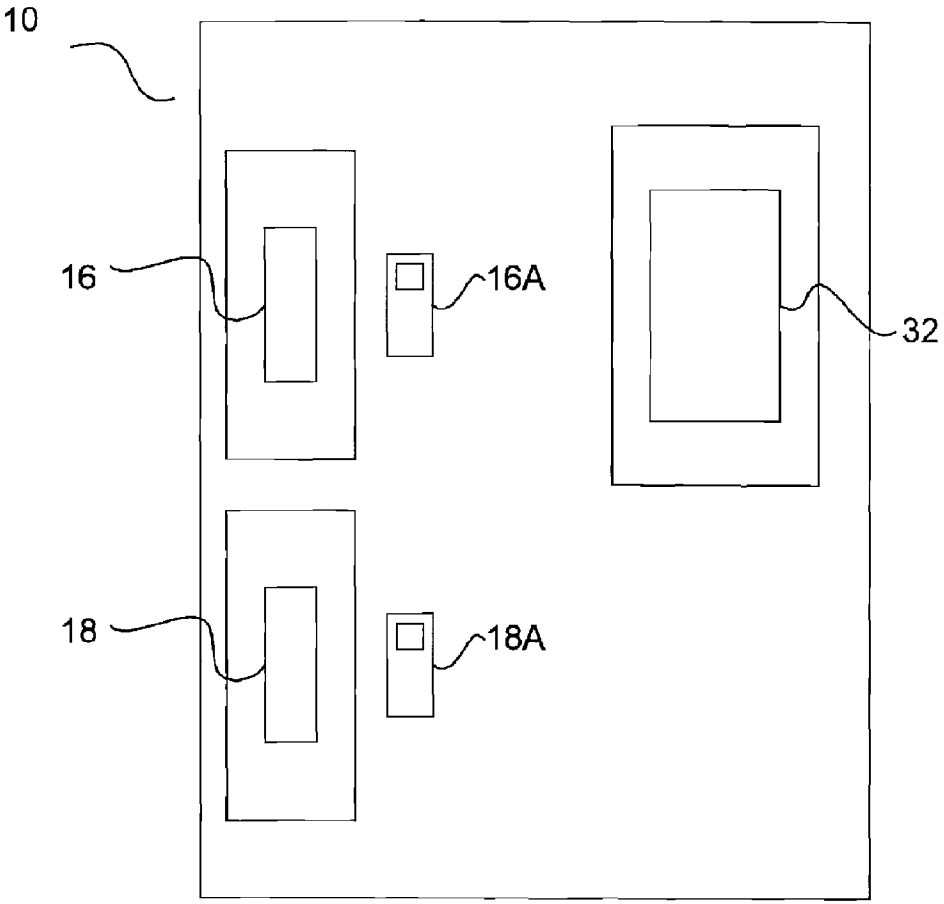
FIG. 3 illustrates a side view of the MPC according to an embodiment.

FIG. 3 illustrates a side view of the MPC 10. The wheel-like structures 16, 18 are illustrated in their respective compartments with covers removed (covers not illustrated). As described above, wheel-like structures 16, 18 each comprise a retractable power output cable. A polarity switch 16A allows a user to change the polarity of the voltage delivered via the power output cable stored on wheel-like structure 16. A polarity switch 18A allows a user to change the polarity of the voltage delivered via the power output cable stored on wheel-like structures 18. [A] *Internal* battery [28] *32* is accessible in a compartment (illustrated with battery cover removed).

Figure 4:
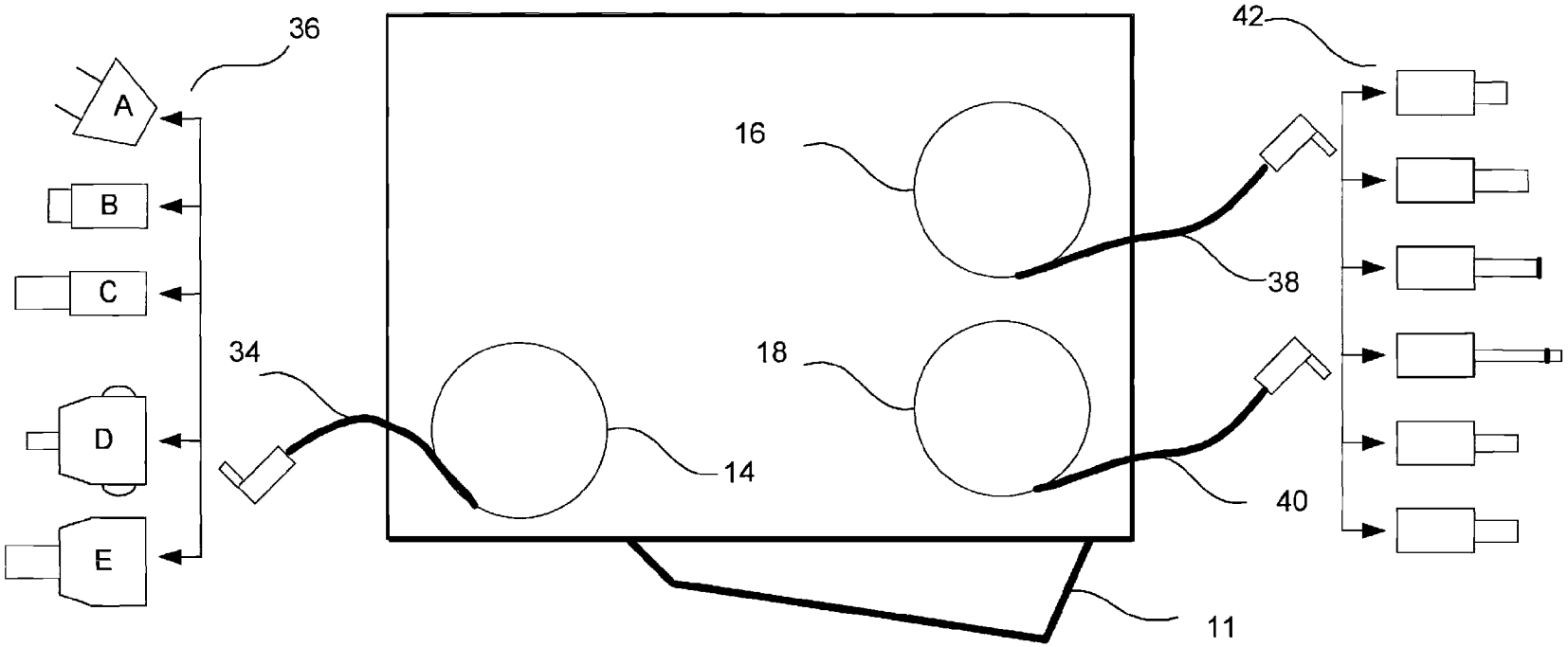
FIG. 4 illustrates deployment of input and output cables according to an embodiment.

FIG. 4 illustrates deployment of DC input and output cables according to an embodiment. Retractable cables 38, 40 provide power to a variety of mobile devices, such as PDA's, MP3 players, a GPS device, notebook computer, cell phones, and other mobile devices. An inventory of output DC charging plugs 42 is provided so that any variety of mobile devices may be charged. Retractable cable 34 allows a cable to be connected through input plugs 36 to an external power supply. Illustrated in FIG. 4 are an AC adapter plug 36A, a Firewire connector 36B, a USB connector 36C, a car power adapter 36D, and an airplane adapter 36E. The illustrated connectors are not intended to be limiting and other sources of power may connected to the retractable cable 34 to provide power to charge the internal battery of the MPC and to provide power to cables 38 and 40.

Figure 5:
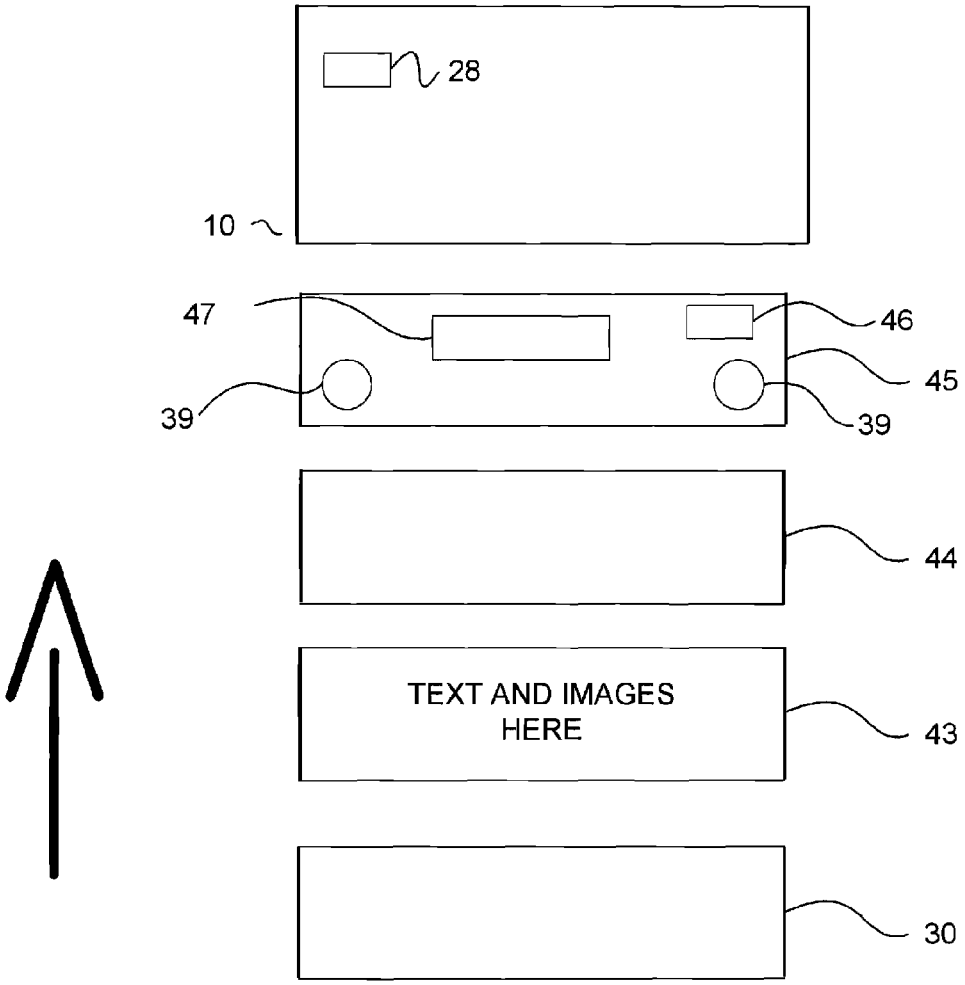
FIG. 5 illustrates exemplary removable surfaces that may be used in with the MPC according to an embodiment.

FIG. 5 illustrates exemplary removable surfaces that may be used in conjunction with a MPC according to an embodiment. The MPC 10 comprises a slot having electrical contacts 28 that engage connector pins of various panel-style devices. In an embodiment, the panel-styled device is a solar panel and the pins function as a "charge-in" connector. In another embodiment, the panel-style device is a digital music player and the pins function as a "charge out" connector. In yet another embodiment, the panel-style device comprises a storage medium and the connector pins enable data transfer and exchange through and within the MPC.

In an embodiment, a removable surface comprises a solar cell 30 that can be inserted into the MPC slot so as to make contact with the electrical contacts 28. The solar cell 30 is capable of converting solar energy to electrical energy, charging the internal battery of the MPC (see FIG. 3, [28] *32*). In yet another embodiment, the slot will accommodate additional types of solar cells that may exist in the future. This interchangeable solar cell 44 slides into the slot of MPC 10 to provide charging to the internal battery.

In another embodiment, a promotional/sponsor insert 43 is inserted into the slot of the MPC. This sponsor insert 43 comprises advertising/images germane to the advertising needs of a particular sponsor. When inserted into the slot of MPC 10, the sponsor insert 43 makes contact with the electrical charge contacts for power 28 and displays messages and images indicative of a particular sponsor.

In still another embodiment of the removable surface, a game interface 45 is provided to allow a user to have entertainment from the device at various times. The game interface 45 slides into the slot of MPC 10 and provides selection means 46 for selecting a particular type of game. The game is then displayed on an LCD display 47 integrated with game interface 45. Controls for the game 48 are provided in a touch screen area of the game interface 45, so that the game can be played by the user.

The exemplary removable surfaces described above are not meant to be limiting. For example, other such surfaces may include an MP3 player, a clock with alarm, a calculator, a GPS receiver and a PDA. These devices, all of which require charging to operate, operate off the internal battery of the MPC while at the same time having their own batteries charged.

Figure 6:
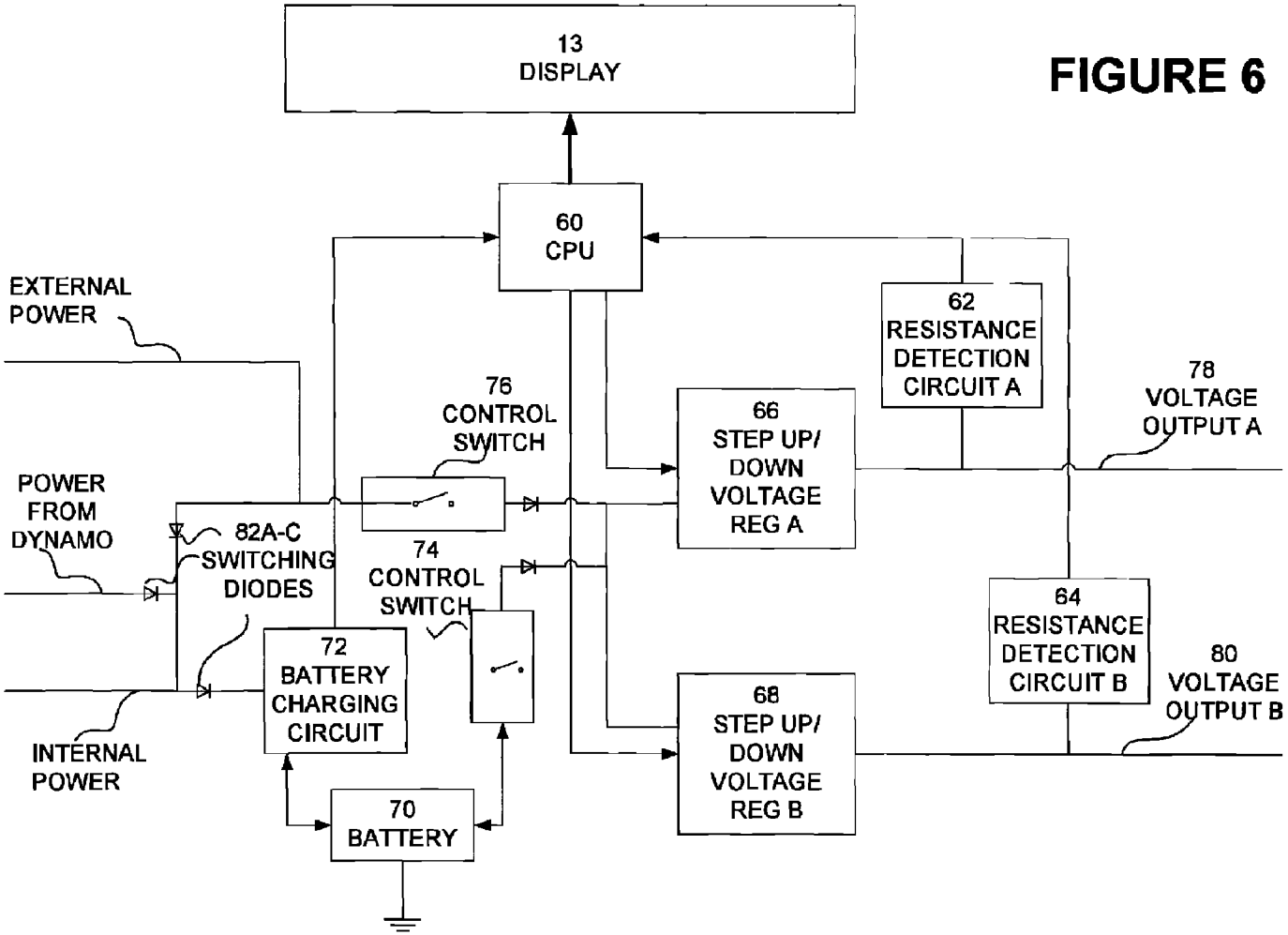
FIG. 6 illustrates a block diagram of components of the MPC according to an embodiment.

FIG. 6 illustrates a block diagram of the logical components of an MPC according to an embodiment. Display 13 is responsive to signals received from CPU 60. CPU 60 is responsive to the position of modes setting switches (see, FIG. 7, 100-109), to resistance detection circuit A 62 and resistance detection circuit B 64, and to battery charging circuit 72. Control switches 74 and 76 direct power from internal and external sources respectively to charge the internal battery 70 or to provide power to voltage output A 78 and voltage output B 80.

External, internal solar, and dynamo power sources are connected in parallel switching diodes 82A, 82B, and 82C. The switching diodes select the activate source to connect to the battery charging circuit automatically with out any manual switching or selection. If more than one source of power is connected and activated at the same time, the switching diodes can compare which is the highest voltage source and will switch to that source automatically. This way the lower voltage source will be cut off.

Resistance detection circuit 62 detects the resistance of a charging plug (see, FIG. 8, 42). In an automatic mode, CPU 60 controls step up/down voltage regulator A 66 to provide a voltage to voltage output A 78 that is determined by the detected resistance. Resistance detection circuit B 64 operates in the same manner.

In a manual mode, CPU 60 is responsive to voltage up and down controls (see, FIG. 7, 100-103) to control the output of step up/down voltage regulator A 66 and step up/down voltage regulator B 68.

The polarity of voltage output A 78 and voltage output B 80 can be change via polarity switches (not illustrated in FIG. 6 but illustrated in FIG. 3 as elements 16A and 16B).

Figure 7:
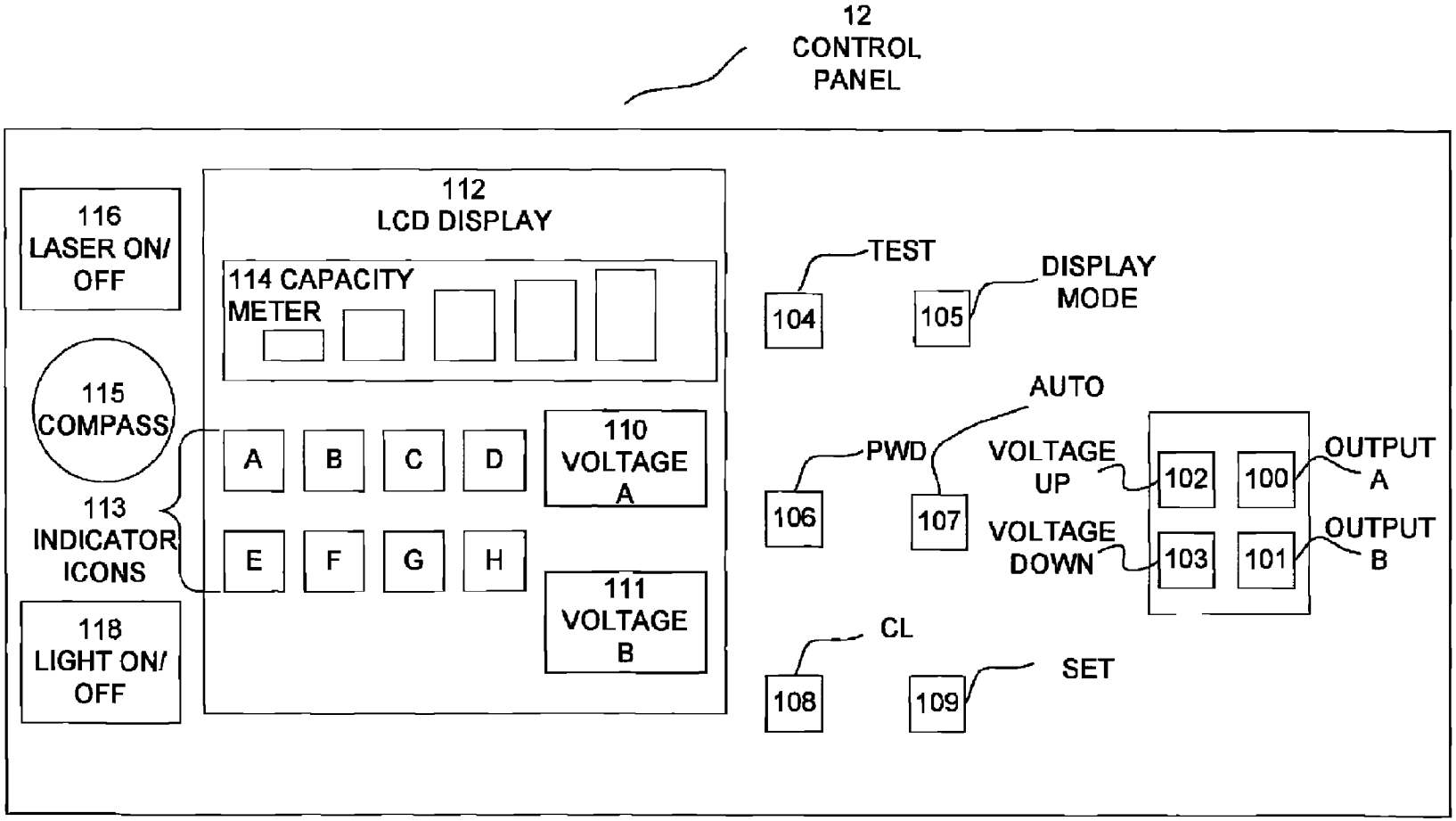
FIG. 7 illustrates a control panel of the MPC according to an embodiment.

FIG. 7 illustrates a control panel of the MPC according to an embodiment. The control panel 7 comprises an LCD display 112 and a series of control buttons. Output buttons 100, 101 control the interface of the MPC to at least two different devices. It should be noted that the fact that two output buttons are illustrated is not meant as a limitation. The internal logic and functioning of the MPC can allow more than two devices to be powered and/or charged by the MPC. Thus, the presence of two buttons is illustrative only and is not meant as a limitation. Once a particular output device is selected, voltage adjust buttons, 102, 103 are used to manually adjust the voltage (if necessary) that is reaching the device that is being powered by the MPC. A further display control button 105 is provided to select a charging mode, a data transfer/exchange mode, a data delete mode and a display appearance mode. The charging and data modes are described in detail below. The appearance mode allows a user to control the backlighting of the LCD screen 112 so that it can be visible in different environments. A test button 104 is provided to allow a user to determine if all the functions of the MPC are operating correctly as depicted on the LCD screen 112. A set button 109 is provided to lock the voltage that has been manually selected by a user to charge a targeted mobile device for further charging. The MPC can operate in an automatic mode by depressing an auto function button 107. This auto function button 107 allows the MPC 10 to automatically detect and provide appropriate charging to the selected output and therefore to the device being charged. The MPC is in effect an AC-DC adapter, a DC-DC adapter, and a USB/Firewire-DC adapter to further transmit and provide user selected power voltage ranging from about 1.9 volts to 24 volts and related watts and amperage to various power chargeable devices. It is also a multi-source internal battery rechargeable charger that can automatically use or select any one or more than one type of simultaneous charging through AC. DC, USB, Firewire, Solar and Handcrank/dynamo through its integrated CPU processor to optimally charge the MPC itself and any device (s) attached to it.

As described below (FIG. 10) the detection of the input source is automatic and governed by processor logic. When an input cable is used to connect either to an AC, DC or USB/Firewire source, the processor senses the type of power it receives and automatically converts that power to the type necessary to charge the portable unit that has been selected by the user based on the plug or bridge selected or by the power requirements of the portable unit that are selected by the user via the control panel.

The LCD buttons or, control panel, with the exception of the flashlight 118 and laser light 116, are also locked automatically when the hand crank is activated as a power source. This feature prevents an accidental change of voltage during charging operations as the user can potentially use the thumb or other fingers to place on the control panel's button area to hold the MPC when the crank that is located directly below the MPC is activated. In an embodiment, a HOLD button (not illustrated) can be used to manually lock the buttons or control functions to prevent accidental change of voltage or other operational features in other environments. When this is activated, the processor senses this and will not allow a change in operations until that function is released. A compass 115 is also illustrated.

In yet another embodiment, the MPC may use the manual and automatic function in combination to of detecting and charging a target mobile device. In yet another embodiment, the MPC stores and recalls the last voltage selected manually in the manual mode so that a user can easily select this method voltage selection repeatedly without having to specifically select the same voltage that is constantly used. In another embodiment, the MPC's breaching plug's preset voltage limitation output used in the AUTO DETECT mode can be overridden in the manual mode. This allows for the same plug(s) which has a preset voltage limitation in the AUTO DETECT mode to be used for a different voltage selection that a different mobile device may require in the manual mode, thus allowing for a wider use and connectivity of the same plugs. It should also be noted that, since more than one portable unit can be charged at the same time, a user can select either the manual or automatic modes for charging in any combinations various portable devices. Thus, a manual mode may be selected to specify charging characteristics for one unit and an automatic mode can be used to select charging characteristics for the second unit and in any combination, allowing for a more universal type charging of diverse electrical or electronic mobile devices.

Additional buttons PWD 106 and CL 108 are provided. PWD 106 (Power Detect) button is used to instantly check the current level of battery power in the MPC and this is displayed in the capacity meter 114. The capacity meter operates in a "power-saver" mode so that it does no use electrical energy unnecessarily. The CL 108 (CLEAR) button is used to clear current display of a previously selected voltage setting that might have been made in the MANUAL mode.

The display 112 comprises a number of different areas to allow a user to determine that the MPC is functioning properly. A capacity meter 114 is shown which indicates in a bar graph form the amount of charge that is present in the internal battery of the MPC 10. Another area depicts how the internal battery of the MPC battery is being charged. For example, icons indicate whether the MPC is being charged from an external source 113C, from solar energy 113B, or from hand cranking 113A. It should be noted again that the internal battery of the MPC can be charged by multiple means simultaneously as controlled by the internal logic without the need for the user to select a particular method of internal charging.

The control panel of the MPC also comprises a button 118 that controls a flashlight (see FIG. 1, 24) and a button 116 that controls a laser pointer (see FIG. 1, 26) as desired. The display 112 further comprises an area showing the output voltage to the devices that are to be charged. Voltage A 110 displays the voltage at output A and voltage B 111 displays the voltage at output B. This voltage indication area also provides a flashing indicator when charging an external device that a particular voltage is taking place. It should be noted that these various indications on display screen 112 are not meant as limitations. The purpose of the display screen 112 is to provide a user with a complete indication of the functioning of the MPC at any given point in time.

The MPC can automatically select which way to charge its internal rechargeable battery when either connected to an AC, DC, USB/Firewire, solar or hand crank method of charging its internal battery. This way it is also possible to charge external devices that are connected to the MPC via its output cables or any device that may be present in its side multimedia/solar panel slot. In other words, user selection is not necessary to select a particular source of charging as it is automatic. The external power sources and the two internal power sources like the hand crank dynamo and solar cell panel can produce a charging current through a switching diode and battery charging circuit connected to the internal rechargeable battery in parallel. As such, all of the sources can give the charging current to the battery simultaneously without any manual selection or switching. Additionally, while current is being provided to charge the battery, current may also simultaneously be provided to charge or power a device connected to the MPC output cables from one or more of the external power sources.

Figure 8A:
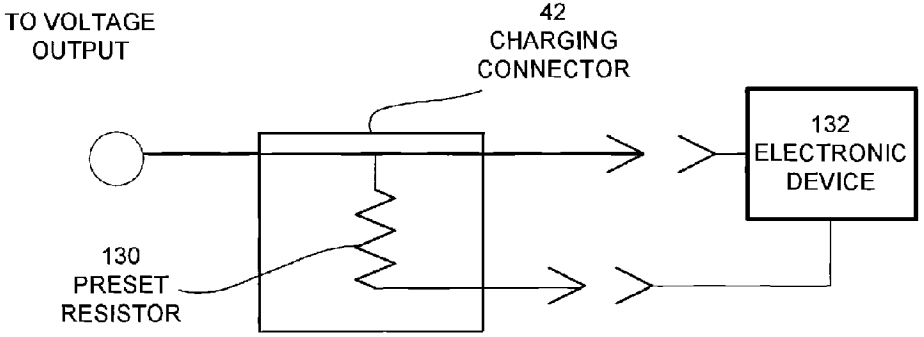
FIGS. 8A and B illustrate block diagrams of an auto detect CPU circuit of the MPC according to embodiments.

FIG. 8A illustrates a block diagram of an auto detect charging connector CPU circuit of the MPC according to an embodiment. Referring to FIGS. 6 and 8, a charging connector 42 comprises a preset resistor 130. As described below, preset resistor 130 is used by the MPC 10 in an automatic mode to select an output voltage to charge electronic device 132.

Figure 8B:
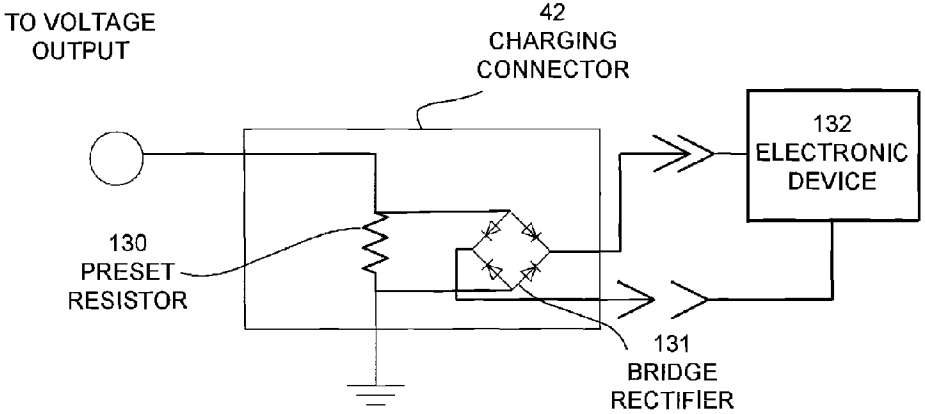

FIG. 8B illustrates a block diagram of an auto detect charging connector CPU circuit of the MPC that utilizes a bridge rectifier according to an embodiment. Referring to FIGS. 6 and 8, a charging connector 42 comprises a preset resistor 130. As described below, preset resistor 130 is used by the MPC 10 in an automatic mode to select an output voltage to charge electronic device 132. In this embodiment, bridge rectifier 131 automatically determines the polarity of the voltage required by electronic device 132.

Figure 9A:
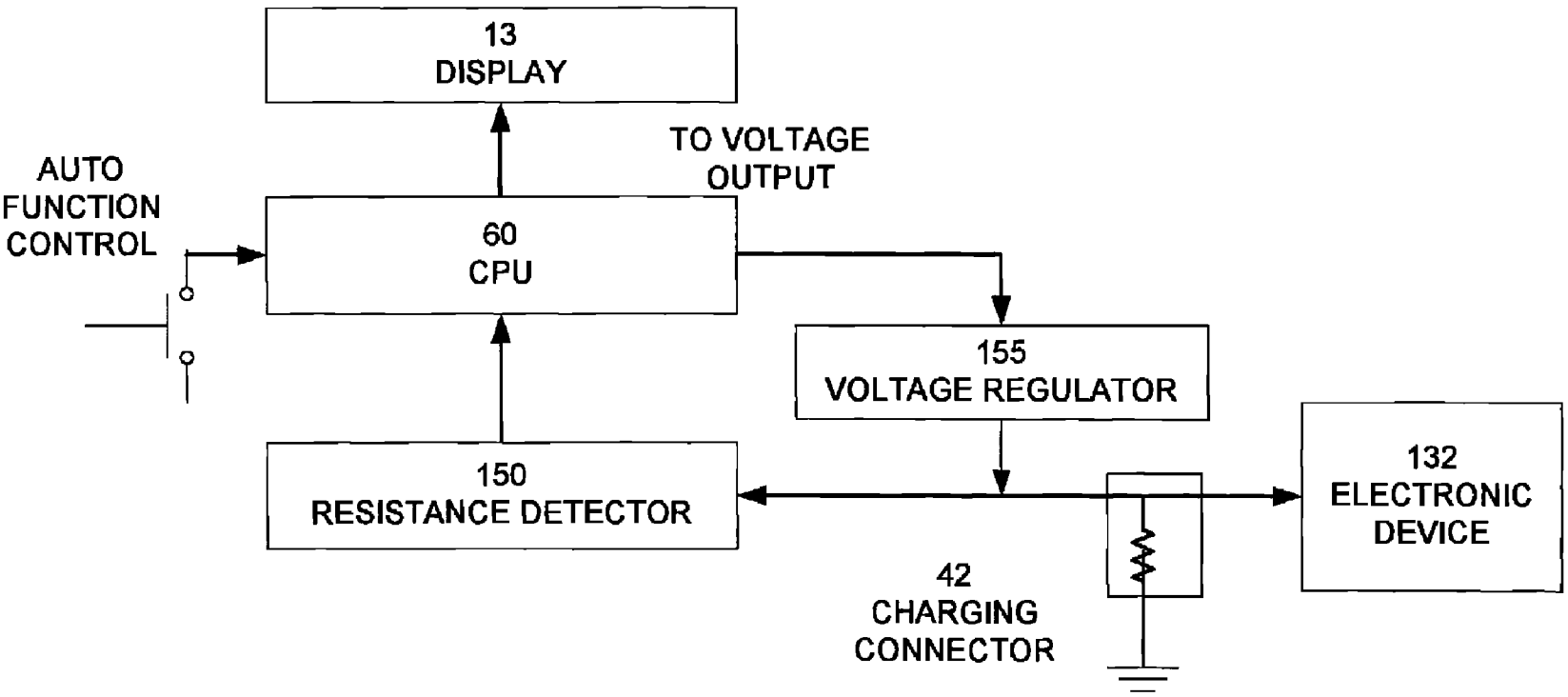
FIG. 9A illustrates a block diagram of the logical components of an automatic voltage selection circuit according to an embodiment hereof.

FIG. 9A illustrates a block diagram of the logical components of an automatic voltage selection circuit according to an embodiment hereof. MPC comprises internal control logic embodied in instructions in the CPU 60. The CPU 60, when operating in an automatic mode, receives a signal indicative of the resistance of preset resistor 130 (see FIG. 8, 130) in charging connector 42 from resistance detector 150. CPU 60 provides preset voltage control instructions to voltage regulator 155, which establishes a voltage for electronic device 132.

Figure 9B:
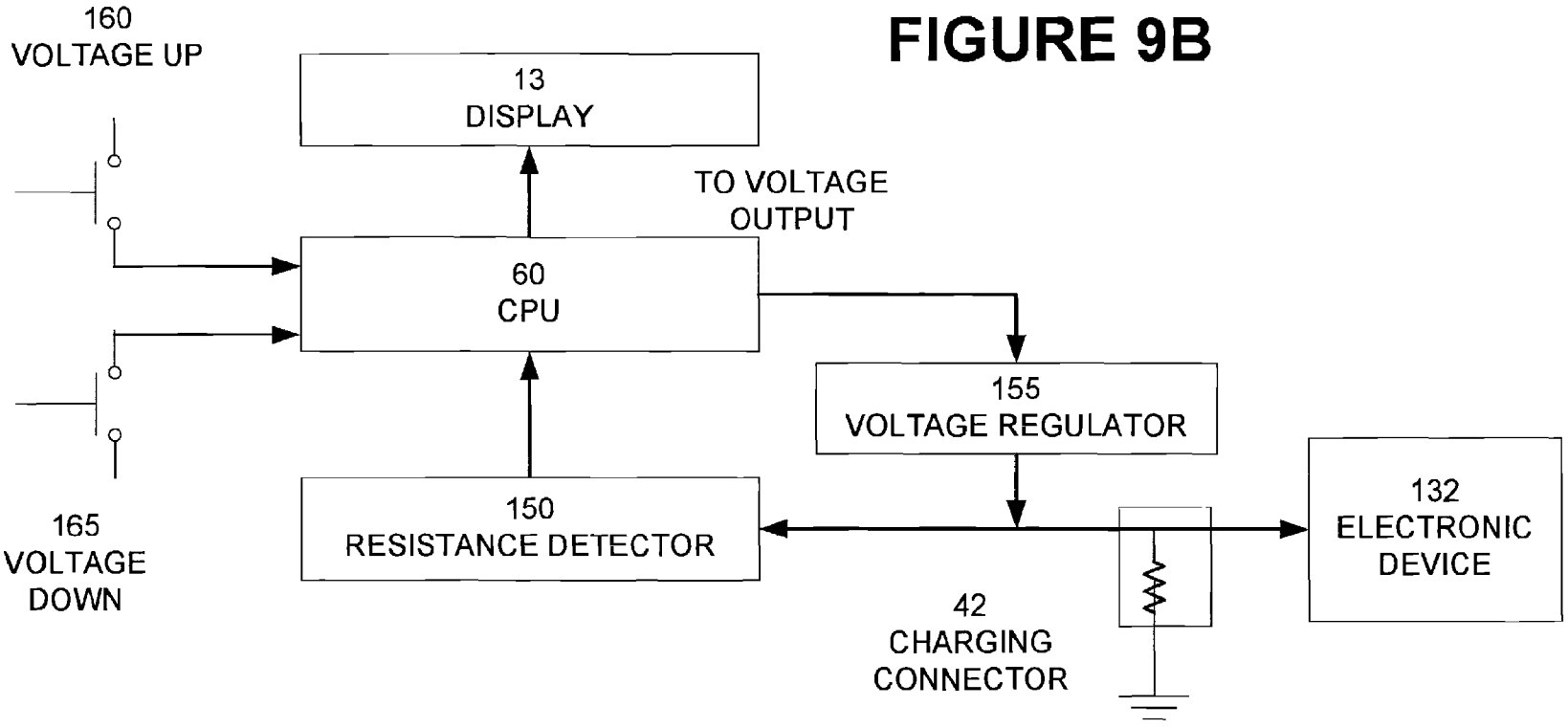
FIG. 9B illustrates a block diagram of the logical components of a manual voltage selection circuit according to an embodiment hereof.

FIG. 9B illustrates a block diagram of the logical components of a manual voltage selection circuit according to an embodiment hereof. In this mode, the signal of resistance detector 150 is disregarded by CPU 60. The CPU 60 is responsive to voltage up controller 160 and voltage down controller 165. Once the correct voltage is selected using the up-down controllers, the voltage is set by pressing the "SET" button on the control panel (FIG. 7, 109).

Figure 10:
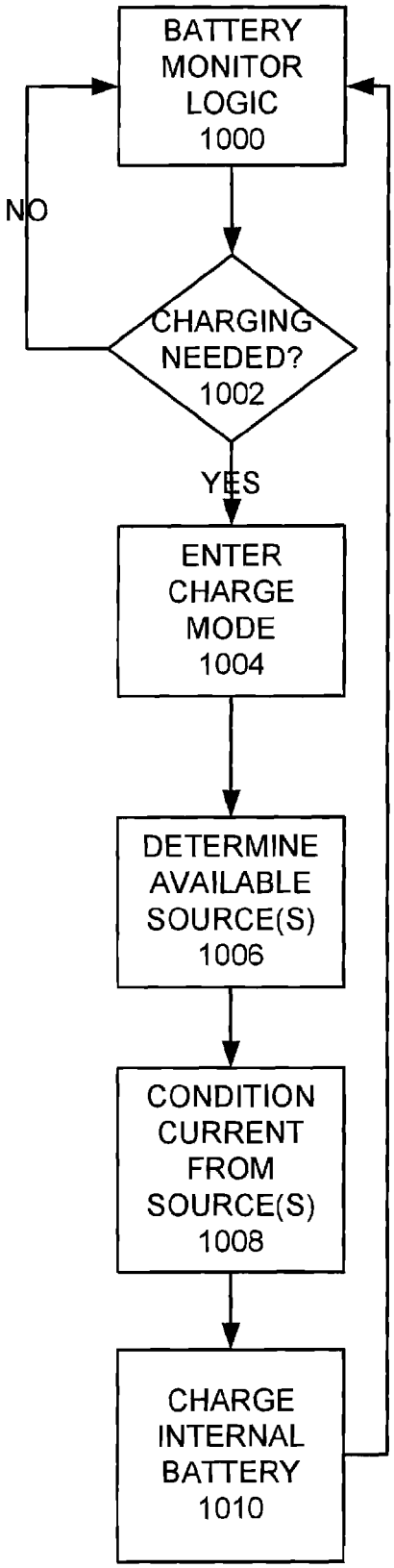
FIG. 10 illustrates control logic according to an embodiment.

Referring now to FIG. 10, the MPC control logic is illustrated. The MPC, upon being turned on, launches control logic to monitor the status of the MPC. Battery control monitor logic 1000 constantly checks the charge level of the internal battery of the MPC and determines if charging is needed 1002. If no charge is needed, the battery monitor control logic 1000 continues to monitor the charge level of the internal battery.

If it is determined that charging is needed 1002, the controller enters the charge mode 1004 and searches for what sources(s) of energy are available 1006. In an embodiment of the MPC charging sources can be wall current, solar cell, or hand cranked electrical source.

Depending on the source available, the controller conditions the current from the source 1008 and applies a charge to the internal MPC battery 1010. The control logic can accept current from multiple sources simultaneously and condition those sources so that battery charging can continue regardless of the sources from which the energy is coming. During charging, the battery control monitor logic 1000 continues to monitor the internal battery status so that charging continues only when needed.

Figure 11:
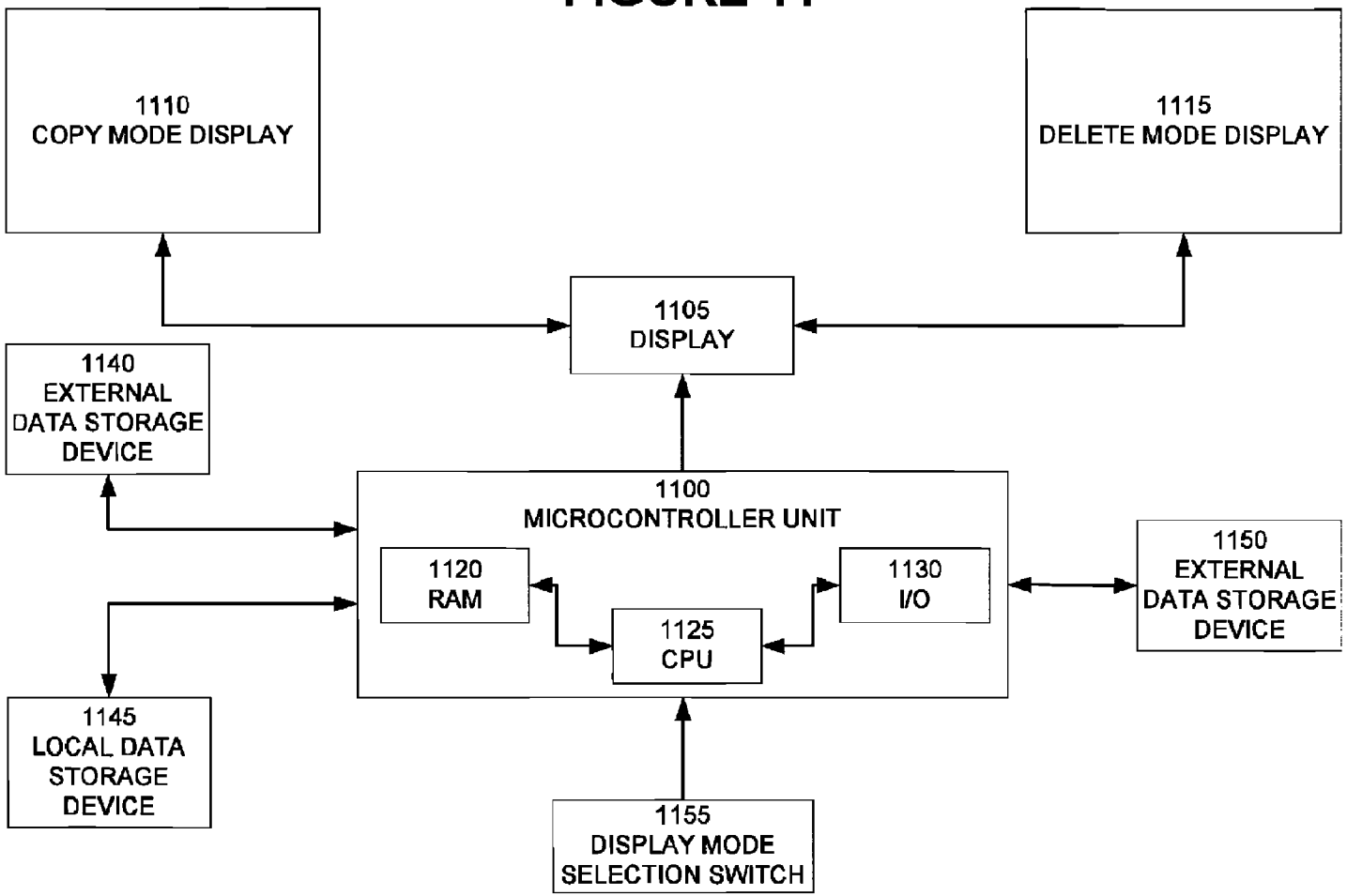
FIG. 11 illustrates additional circuitry to enable an MPC to perform data management functions according to an embodiment.

FIG. 11 illustrates additional circuitry to enable an MPC to perform data management functions according to an embodiment. Microcontroller unit 1100 RAM 1120, CPU 1125, and I/O 1130. Microcontroller unit 1100 is connected to display 1105, which produces a copy mode display 1110 and a delete mode display 1115 in response to a display mode selection switch 1155. Microcontroller unit 1100 routes data to and from external data storage devices 1140 and 1150 and internal data storage device 1145. By way of illustration and not as a limitation, an external data storage device may be a computer, a PDA, an MP3 player, a cell phone, or a flash memory device. The local storage device may be an MP3 player or memory device that is connected to the MPC through connector 28 illustrated in FIG. 5. It should be noted that the MPC can operate as a standalone device for transferring data between other hand held devices such as PDA's, cell phones, iPods and the like that are connected to its various ports. It does not have to be connected to a computer to effect the data transfer/exchange contemplated herein or it can also be connected to a computer to effect the transfer of data between the various devices attached to it and the computer to which it may be connected to.

It will be understood by those skilled in the art that the present invention may be, without limitation, embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, and instantiation of scripts or code segments is in all respects illustrative and not limiting.

What is claimed is:

1. A multi-power charger comprising:

an internal battery;

a first input receptacle for connecting to a first external power source;

a first output receptacle for connecting to a first device;

a voltage selection circuit, wherein the voltage selection comprises logic for:

determining a first operating voltage of the first device;

selecting a first power supply source to supply the first operating voltage of the first device, wherein the first power supply source is at least one of the group consisting of the internal battery and the first external power source; and delivering the first operating voltage to the first output receptacle.

2. The multi-power charger of claim 1, wherein the first external power source is selected from the group consisting of an AC adapter, a computer power supply via a Firewire connection, a computer power supply via a USB connection, a vehicle battery via a power adapter, and an airplane electrical system via a power adapter.

3. The multi-power charger of claim 1, wherein the first device is selected from the group consisting of an PDA, an MP3 player, a GPS device, notebook computer, and a cell phone.

4. The multi-power charger of claim 1 further comprising a second output receptacle for connecting to a second device and wherein the voltage selection further comprises logic for:

determining a second operating voltage of the second device; selecting a second power supply source to supply the second operating voltage of the second device, wherein the second power supply source is at least one of the group consisting of the internal battery and the first external power source; and delivering the second operating voltage to the second output receptacle while simultaneously delivering the first operating voltage to the first output receptacle.

5. The multi-power charger of claim 4, wherein the first device and the second device are each selected from the group consisting of an PDA, an MP3 player, a GPS device, notebook computer, and a cell phone.

6. The multi-power charger of claim 4, wherein the first external power source is selected from the group consisting of an AC adapter, a computer power supply via a Firewire connection, a computer power supply via a USB connection, a vehicle battery via a power adapter, and an airplane electrical system via a power adapter.

7. The multi-power charger of claim 1 further comprising a second external power source and wherein the voltage selection circuit further comprises logic for:

selecting a first power supply source to supply the first operating voltage of the first device, wherein the first power supply source is selected from the group consisting of the first internal power source, the first external power source, and the second external power source; and delivering the first operating voltage to the first output receptacle.

8. The multi-power charger of claim 7, wherein the first external power source and the second external power source are each selected from the group consisting of an AC adapter, a computer power supply via a Firewire connection, a computer power supply via a USB connection, a vehicle battery via a power adapter, and an airplane electrical system via a power adapter.

9. The multi-power charger of claim 1 further comprising an internal charging circuit, wherein the internal charging circuit comprises logic for:

receiving power from an internal charging source;

receiving power from the first external power source via the first input receptacle;

determining whether the internal battery is discharged;

if the internal battery is discharged, then determining whether the first external power source and the internal charging source are of sufficient capacity to deliver the first operating voltage of the first device and provide power to the internal battery;

if the first external power source and the internal charging source are of sufficient capacity to deliver the first operating voltage of the first device and to provide power to the internal battery, then providing power to the internal battery from at least one of the internal charging source and the first external power source;

determining when the internal battery is fully charged; and if the internal battery is fully charged, ceasing providing power to the internal battery.

10. The multi-power charger of claim 9, wherein the first internal charging source is selected from the group consisting of a solar panel and a hand-cranked dynamo.

11. The multi-power charger of claim 9, wherein the first external power source is selected from the group consisting of an AC adapter, a computer power supply via a Firewire connection, a computer power supply via a USB connection, a vehicle battery via a power adapter, and an airplane electrical system via a power adapter.

12. The multi-power charger of claim 1 further comprising an internal charging circuit, wherein the internal charging circuit comprises logic for:

receiving power from an internal charging source;

receiving power from the first external power source via the first input receptacle;

receiving power from the second external power source via the second input receptacle;

determining whether the internal battery is discharged;

if the internal battery is discharged, then determining whether the first external power source, the second external power source, and the internal charging source are collectively of sufficient capacity to deliver the first operating voltage of the first device and provide power to the internal battery;

if the first external power source, the second external power source, and the internal charging source are collectively of sufficient capacity to deliver the first operating voltage of the first device and provide power to the internal battery, then providing power to the internal battery from at least one of the internal charging source, the first external power source, and the second external power source;

determining when the internal battery is fully charged; and if the internal battery is fully charged, ceasing providing power to the internal battery.

13. The multi-power charger of claim 11, wherein the first external power source and the second external power source are each selected from the group consisting of an AC adapter, a computer power supply via a Firewire connection, a computer power supply via a USB connection, a vehicle battery via a power adapter, and an airplane electrical system via a power adapter.

14. The multi-power charger of claim 1, wherein the first device comprises a first device battery, wherein the multi-power charger further comprising an external charging circuit and wherein the external charging circuit comprises logic for:

determining whether the first device battery is discharged;

if the first device battery is discharged, then providing power to the first device battery via the first output receptacle;

determining whether the first device battery is fully charged; and if the first device battery is fully charged, ceasing providing power to the first device battery.

15. The multi-power charger of claim 4, wherein the first device comprises a first device battery and the second device comprises a second device battery, wherein the multi-power charger further comprising an external charging circuit and wherein the external charging circuit comprises logic for:

determining whether the first device battery is discharged;

if the first device battery is discharged, then providing power to the first device battery via the first output receptacle;

determining whether the first device battery is fully charged; and if the first device battery is fully charged, ceasing providing power to the first device battery;

determining whether the second device battery is discharged;

if the second device battery is discharged, then providing power to the second device battery via the second output receptacle;

determining whether the second device battery is fully charged; and if the first device battery is fully charged, ceasing providing power to the second device battery.

*16. A portable rechargeable device for the charging of other portable rechargeable devices, comprising:*

*a compartment for an onboard rechargeable battery;*

*a first power input interface for connecting to a first external power source;*

*a first power output interface for connecting to another portable rechargeable device;*

*a first alternate onboard power source;*

*circuitry for recharging said onboard rechargeable battery from one or more of said first external power source and said first alternate onboard power source;*

*circuitry for selecting a power source from among two or more active power sources and for providing power from said selected power source to one or more of said rechargeable battery and said first power output interface.*

*17. A portable rechargeable device according to claim 16, further comprising:*

*circuitry for automatically detecting whether one or more of said first external power source, and said first alternate onboard power source are an active power source.*

*18. A portable rechargeable device according to claim 16, further comprising:*

*a second alternate onboard power source.*

*19. A portable rechargeable device according to claim 16, further comprising:*

*circuitry for automatically detecting a highest voltage from among active power sources.*

*20. A portable rechargeable device according to claim 16, further comprising:*

*circuitry for automatically providing power from said detected higher voltage power source to said first power output interface for charging another portable rechargeable device.*

* * * * *